W. P. WILSON.
VEHICLE SUSPENSION.
APPLICATION FILED DEC. 6, 1920.
1,408,674.
Patented Mar. 7, 1922.
3 SHEETS—SHEET 3.
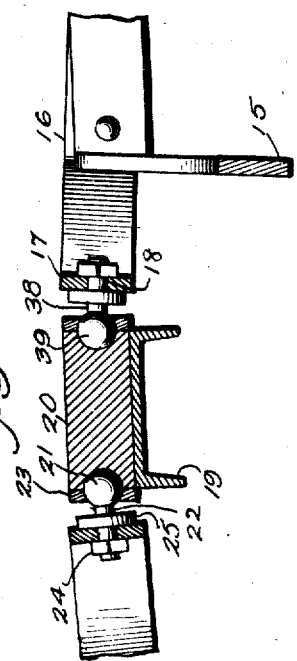
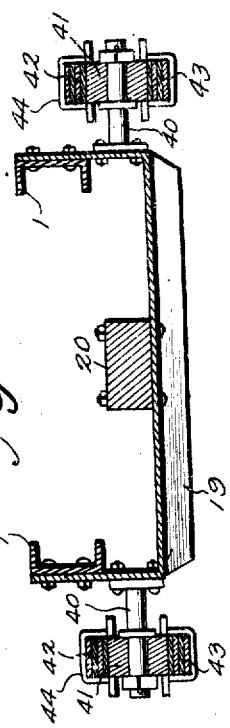
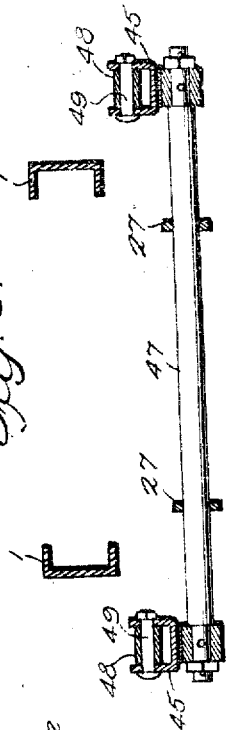
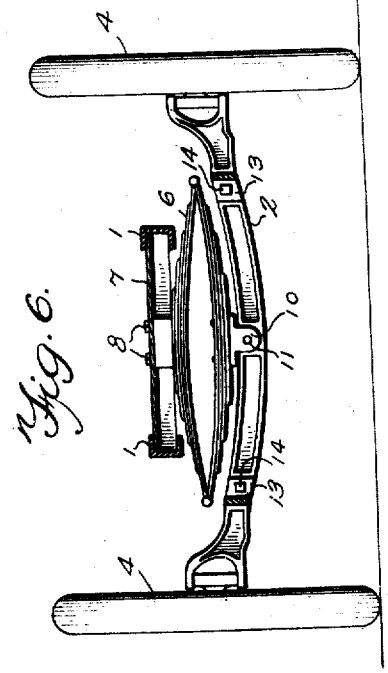
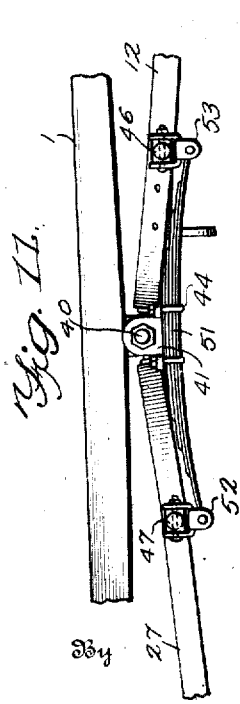
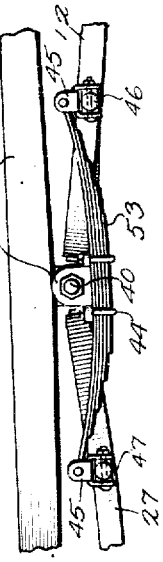
Inventor
W. P. Wilson
By
Attorney

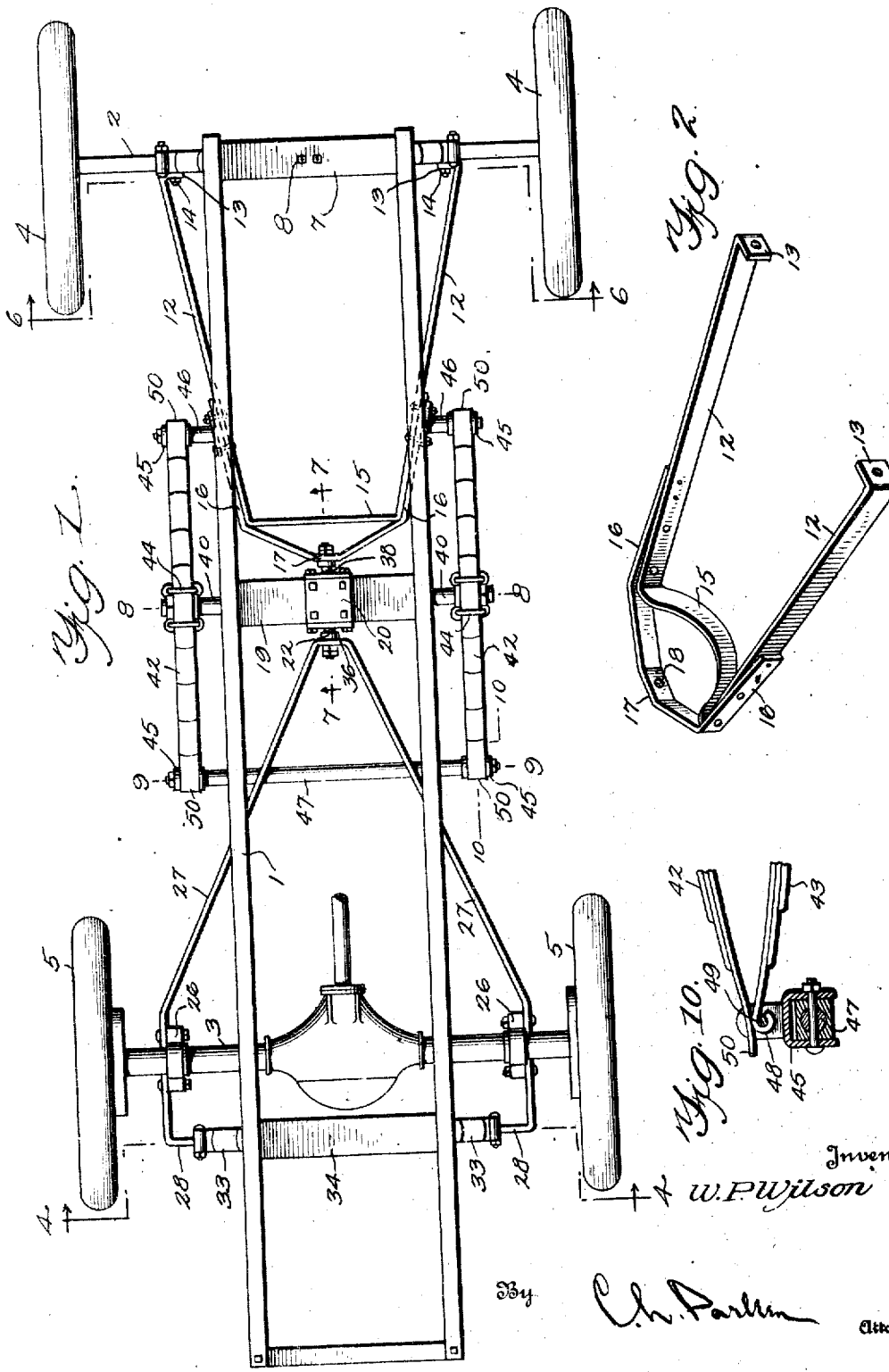

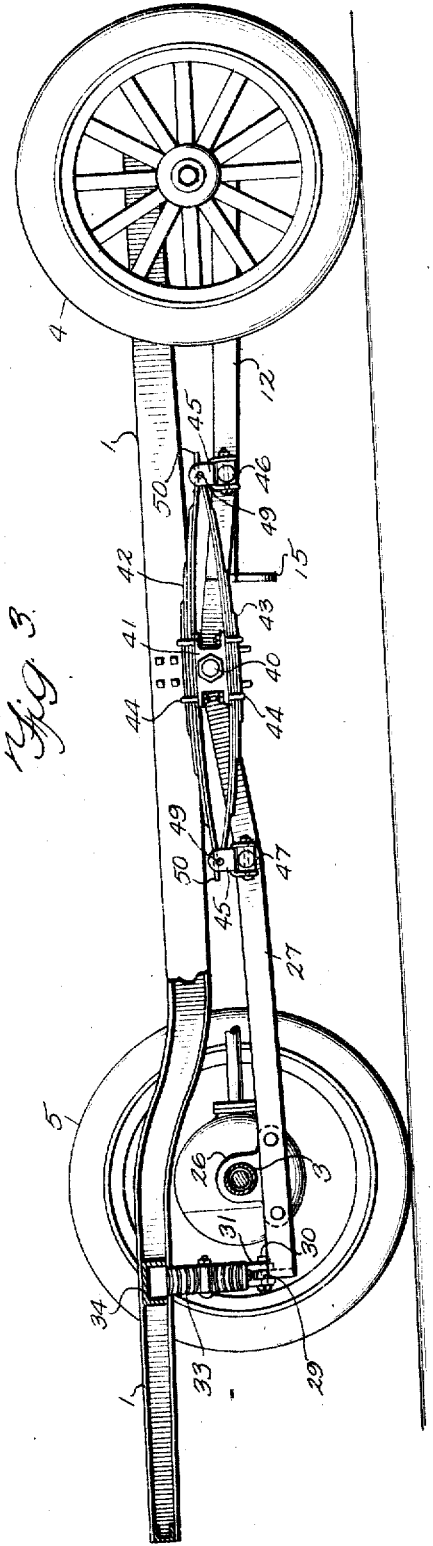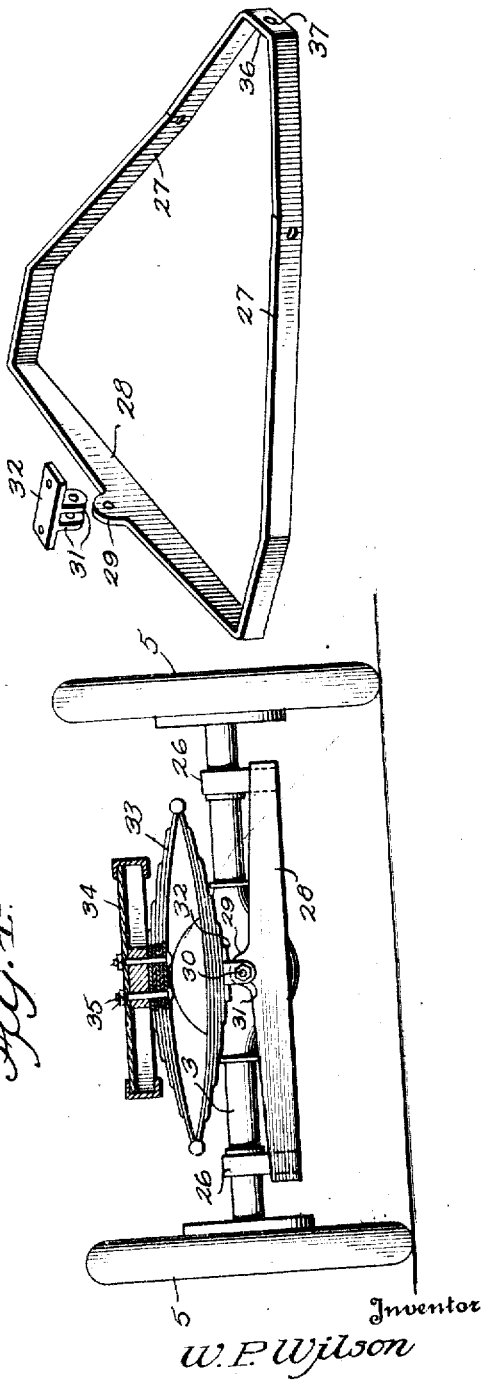

UNITED STATES PATENT OFFICE.

WILLIAM P. WILSON, OF WASHINGTON, DISTRICT OF COLUMBIA.

VEHICLE SUSPENSION.

1,408,674. Specification of Letters Patent. Patented Mar. 7, 1922.

Application filed December 6, 1920. Serial No. 428,519.

*To all whom it may concern:*

Be it known that I, WILLIAM P. WILSON, a citizen of the United States, residing at Washington, in the District of Columbia, have invented certain new and useful Improvements in Vehicle Suspensions, of which the following is a specification.

This invention relates to supporting structures for vehicle bodies, and it comprises an upper frame, front and rear axles having pivotal connection to adjacent portions of the frame, distance members connected to said front and rear axles, said distance members being pivotally connected to said upper frame at points remote from the front and rear and in axial alinement with the first mentioned pivots, and cushioning members arranged between said upper frame and said distance members.

In the present invention, I have produced a construction wherein the forces which tend to stress the body supporting frame of an automobile chassis and body mounted thereon in a torsional manner are eliminated, thus permitting the employment of a lighter and more economical construction of said frame and body. By means of the present construction, the comfort of passengers in riding is materially increased, due to the minimizing of the effect of road shocks and swaying motion incident to inequalities in the road.

In the present construction, I employ means for permitting free limited motion of the axles with respect to the upper frame or body supporting member, which free motion may take place without sensible change in the deflection of any of the supporting springs. I find it advantageous to employ springs in the combination to eliminate the effect of shocks incident to rapid changes in the position of the various parts in a vertical plane.

In the accompanying drawings, I have shown several advantageous embodiments of the invention. In this showing:

Figure 1 is a plan view of the chassis of a motor vehicle showing the invention applied, Figure 2 is a detail perspective view of the front distance member, Figure 3 is a side elevation, Figure 4 is a transverse vertical sectional view on line 4—4 of Figure 1, Figure 5 is a detail perspective view of the rear distance member, Figure 6 is a transverse vertical sectional view on line 6—6 of Figure 1, Figure 7 is a vertical longitudinal sectional view on line 7—7 of Figure 1, Figure 8 is a transverse vertical sectional view on line 8—8 of Figure 1, Figure 9 is a similar view on line 9—9 of Figure 1, Figure 10 is a detail sectional view on line 10—10 of Figure 1, Figure 11 is a detail view showing a slight modification of the spring construction between the upper frame and the distance rods, and, Figure 12 is a similar view of another modification.

Referring to the drawings, the reference numeral 1 designates the upper frame of the chassis adapted to receive and support any suitable type of vehicle body. The vehicle is provided with front and rear axles 2 and 3 respectively, carrying front and rear wheels 4 and 5.

Referring in detail to Figure 6 of the drawings, the front axle is spaced from and secured to the upper frame by means of an elliptical spring 6. As shown, the spring is secured to the cross member 7 of the upper frame by bolts or other fastening means 8. A plate 10 is carried on the under side of the spring and this plate is provided with a pair of spaced ears adapted to be arranged at the front and rear of the axle. The axle and the ears are provided with registering openings adapted to receive a pin or bolt 11, whereby the axle is pivotally supported with respect to the upper frame and is permitted to move independently of the frame. It will, of course, be understood that the arrangement of parts may be reversed and the spring secured rigidly to the axle and pivotally connected to the frame.

A pair of distance rods 12 are connected to the front axle in any suitable manner. As shown in Figure 2, the ends of the rods may be extended at an angle, as at 13, and provided with openings for the reception of bolts 14, passing through the axle. The distance rods may be formed of a single piece of metal, provided with a transverse portion 15. As shown, the distance rods are connected to a pair of arms 16, which arms are provided with a connecting portion 17. The connecting portion is provided with an opening 18, whereby the distance rods are connected to the upper frame. As shown, the upper frame is provided with a centrally arranged transverse member 19 on which is supported a block or member 20, provided with sockets for the reception of the spherical head 21 of bolt 22. The spherical head is retained in the socket by means of a plate 23. The opposite end of the bolt is arranged in opening 18 (see Figure 7) and retained therein by means of nut 24. As shown, the bolt is provided with an enlargement 25, forming a shoulder which is adapted to limit the movement of the member 17 toward the head of the bolt. The pivot of the distance rod is in longitudinal or axial alinement with the pivot 11 of the front axle, whereby the wheels are permitted to swing freely with respect to the upper frame to a limited extent.

The rear axle is supported in bearings 26, carried by the distance rods 27, substantially similar in construction to the distance rods 12 employed on the front axle. As shown, the rear distance rods extend slightly beyond the rear axle and are connected by a transverse member 28. This transverse member 28 is provided with an enlargement 29 having an opening therein for the reception of a pivot pin 30. The pivot pin passes through openings formed in ears 31, carried by plate 32. The rear spring 33 is secured to this plate and is rigidly secured to a transverse member 34 of the upper frame, in any suitable manner, as by bolts 35. It will be apparent that the construction provides an arrangement whereby the rear wheels may swing about the pivot 30 without materially changing the position of the upper frame.

The distance rods 27 are provided with a connecting member 36 having an opening 37 for the reception of a bolt 38, similar in construction to the bolt 22, and provided with a spherical head 39 received in a socket in the member 20, in the manner heretofore described.

In Figures 1 to 10 of the drawings, I have shown a construction wherein a double spring is employed between the upper frame and the distance rods to furnish an elastic support on each side of the main frame.

The springs are arranged opposed to each other, whereby any force acting on them tends to straighten the leaves of one section and curve the leaves of the other, thus producing a neutralizing effect. As shown, the main frame is provided with a pair of projecting members 40. These members are adapted to receive supporting blocks 41 to which the spring leaves are secured, the upper leaves 42 and the lower leaves 43 being rigidly secured to the supporting block by means of bolts 44. The ends of the springs are secured in clips 45 carried by the front and rear distance members. As shown, the front distance members are provided with projecting trunnions 46, on which the clips are mounted and the clips at the rear ends of the springs are arranged on a transverse rod or support 47, secured to the rear distance members.

Referring to Figure 10 of the drawings, the lower spring leaf is provided with a curled end 48, forming an eye for the reception of pin 49, by means of which the spring is secured to the clip. The upper leaf is loosely and slidably mounted in the clip as shown, the end 50 being arranged above the end of the lower spring.

In Figure 11 of the drawings, I have shown a construction wherein a single side spring is used on each side of the vehicle, adapted to exert a force in the same direction as that exerted by the distance members when the vehicle passes over uneven ground. The leaf 51 is secured at its center in the same manner as in the form just described, and the ends of the leaf are secured in clips 52, carried by the trunnions 46 and the transverse rod or shaft 47.

In the form shown in Figure 12 of the drawings, the leaf spring 53 is arranged in the opposite direction and is adapted to exert a force in opposition to that exerted by the supporting structure.

In operation, when a vehicle is equipped with the herein-described supporting structure, forces which tend to stress the body supporting frame and the body torsionally are eliminated. The front and rear axles are each supported at two points in the vertical plane, passing through the longitudinal center of the frame, whereby the front axle and rear axle may each be independently rotated freely through a limited angle. Rotation of the front and rear axles may be effected without any tendency to cause deflection or distortion of the front and rear supporting springs, and without affecting the position of the upper frame.

When the side springs are arranged on the vehicle and the distance rods connected thereto, the movement of the front or rear distance members when the vehicle is passing over uneven ground and one of the wheels enters a depression or passes over an obstruction, is transmitted to the side spring and thence to the other side of the distance rods. The side springs are employed to furnish an elastic support on each side of the upper frame. For example, the vertical movement of the front axle when either wheel passes over an irregularity in the road, is transmitted through the distance rods to the adjacent end of the corresponding side spring. Disregarding the flexibility of the spring, such spring acts as a lever fulcrumed at its rear end and transmits substantially one-half of such vertical movement to the vehicle frame through block 41. The effect of the side springs, therefore, irrespective of their flexibility, is to materially lessen the extent of vertical movements of the front axle which are transmitted to the frame and the flexibility of the springs still further reduces the movement of the frame due to vertical movement of the axle. Similarly, vertical movements of the rear axle which are transmitted to the frame are similarly reduced.

With a double spring employed, as shown in Figures 1 to 10 of the drawings, the downward movement of one of the distance rods tends to flex the lower leaves 43 of the spring and straighten the upper leaves 42, producing a neutralizing effect which tends to absorb the shock and increase the comfort of passengers. In the other two forms of side springs illustrated, the downward movement of the distance rods in each case tends to place the leaves of the spring under increased or relaxed tension, tending to diminish rapid motion or jars which would otherwise be transmitted to the frame.

It is to be understood that the forms of my invention herein shown and described are to be taken as preferred examples of the same, and that various changes in the shape, size, and arrangement of parts may be resorted to without departing from the spirit of my invention or the scope of the subjoined claims.

Having thus described my invention, I claim:

1. Vehicle supporting means comprising an upper frame, front and rear axles, springs arranged between said axles and said frame, said springs being pivotally connected to one of said members and rigidly connected to the other, a transverse member arranged intermediate the front and rear of the upper frame, distance members secured to said axles, said distance members being pivoted to said transverse member in longitudinal alinement with said first mentioned pivots, and springs arranged on said upper frame and secured to each of said distance members.

2. Vehicle body supporting means, comprising an upper frame, front and rear axles, springs arranged between said axles and said frame, said springs being pivotally connected to one of said members and rigidly connected to the other, distance members secured to said axles, said distance members being pivoted to said upper frame at points remote from the front and rear of the frame and in longitudinal alinement with said first mentioned pivots, and springs secured to said upper frame and engaging said distance members.

3. In a vehicle suspension, the combination with an upper frame, of front and rear axles, springs arranged between said frame and said axles, said springs being pivotally connected to one of said members and rigidly connected to the other, members connected to said axles and pivoted to said frame at points remote from the front and rear of said frame and in longitudinal alinement with said first mentioned pivots, and flexible connecting means pivoted to the frame at each side of the vehicle, said connecting means being connected to said members intermediate their front and rear ends.

4. In a vehicle suspension, an upper frame, front and rear axles, springs arranged between said frame and said front and rear axles, said springs being pivotally connected to one of said members and rigidly connected to the other, distance members secured to said axles, said distance members being pivoted to the upper frame substantially centrally thereof and in longitudinal alinement with said first mentioned pivots, and springs arranged on said upper frame, said springs being secured to said upper frame at points intermediate the ends of the springs, the ends of the springs being secured to said front and rear distance members respectively.

5. In a vehicle suspension, an upper frame, front and rear axles, springs arranged between said frame and said front and rear axles, said springs being pivotally connected to one of said members and rigidly connected to the other, distance members secured to said axles, a centrally arranged transverse member carried by said frame, said distance members being pivotally connected to said transverse members at points in longitudinal alinement with said first mentioned pivots, and springs arranged between said upper frame and said distance members.

6. In a vehicle suspension, an upper frame, front and rear axles, springs arranged between said frame and said front and rear axles, said springs being pivotally connected to one of said members and rigidly connected to the other, distance members secured to said axles, a centrally arranged transverse member carried by said frame, said distance members being pivotally connected to said transverse member, said pivots being in longitudinal alinement with said first mentioned pivots, and springs arranged on said upper frame, said springs being secured to said upper frame at points intermediate the ends of the springs, the ends of the springs being secured to said front and rear distance members respectively.

7. In vehicle body supporting means, an upper frame, front and rear axles pivotally connected to said frame, front and rear distance members secured to said axles and pivoted to said frame at points remote from the front and rear of the frame, and flexible connecting means pivoted to the frame and to the front and rear distance members intermediate their front and rear ends.

8. In vehicle body supporting means, an upper frame, front and rear axles pivotally connected to said frame, front and rear distance members secured to said axles and pivoted to said frame at points remote from the front and rear of the frame, and supplemental supporting means pivoted to said upper frame and to the front and rear distance members at points intermediate their ends.

9. In vehicle body supporting means, an upper frame, front and rear axles pivotally connected to said frame, front and rear distance members secured to said axles and pivoted to said frame at points remote from the front and rear of the frame, and springs secured to the frame and secured to the front and rear distance members intermediate their front and rear ends.

In testimony whereof I affix my signature.

WILLIAM P. WILSON.